United States Patent
Hikazudani et al.

(10) Patent No.: US 9,255,004 B2
(45) Date of Patent: *Feb. 9, 2016

(54) CONTINUOUS PRODUCTION METHOD OF HYDROGEN

(71) Applicants: Hitachi Zosen Corporation, Osaka-shi (JP); Kyoto University, Kyoto-shi (JP)

(72) Inventors: Susumu Hikazudani, Osaka (JP); Atsushi Wakui, Osaka (JP); Masaharu Furutera, Osaka (JP); Hitoshi Oshiro, Osaka (JP); Tetsuya Inoue, Osaka (JP); Kazuyuki Hirao, Kyoto (JP)

(73) Assignees: Hitachi Zosen Corporation, Osaka-shi (JP); Kyoto University, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,644

(22) PCT Filed: Jan. 11, 2013

(86) PCT No.: PCT/JP2013/050442
§ 371 (c)(1),
(2) Date: Sep. 24, 2014

(87) PCT Pub. No.: WO2013/145807
PCT Pub. Date: Oct. 3, 2013

(65) Prior Publication Data
US 2015/0056130 A1    Feb. 26, 2015

(30) Foreign Application Priority Data
Mar. 28, 2012   (JP) ................. 2012-073988

(51) Int. Cl.
*C01B 3/06*    (2006.01)
*C01F 7/16*    (2006.01)

(52) U.S. Cl.
CPC . *C01B 3/063* (2013.01); *C01B 3/06* (2013.01); *C01F 7/164* (2013.01); *Y02E 60/324* (2013.01); *Y02E 60/36* (2013.01)

(58) Field of Classification Search
CPC ........... C01F 7/164; C01B 3/06; C01B 3/063; Y02E 60/36; Y02E 60/324
See application file for complete search history.

(56) References Cited

U.S. PATENT DOCUMENTS

2005/0279279 A1    12/2005    Hosono et al.
2012/0040261 A1    2/2012     Nakanishi et al.

FOREIGN PATENT DOCUMENTS

JP    2003-040602 A    2/2003
JP    2006-083009 A    3/2006
(Continued)

OTHER PUBLICATIONS

Yamazaki et al. ""Hydration of calcium aluminates . . . ", in view of Ball the thermal dehydoxylation of C3AH6", 1982, p. 43-53.*
(Continued)

*Primary Examiner* — Stanley Silverman
*Assistant Examiner* — Syed Iqbal
(74) *Attorney, Agent, or Firm* — Locke Lord LLP

(57) ABSTRACT

The present invention provides a continuous production method of hydrogen which is able to produce hydrogen, which is clean energy, simply and continuously without using ammonia. The invention of the continuous production method of hydrogen includes a hydrogen production step comprising introducing mayenite ($Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite to regenerate mayenite and calcium hydroxide; and a circulation step comprising returning the regenerated mayenite and calcium hydroxide into the hydrogen production step. It is preferable that a temperature of water in the hydrogen production step is from 50 to 100° C., and a molar ratio of mayenite to calcium hydroxide is 1/9. In addition, it is preferable that a baking temperature of katoite in the regeneration step is from 300 to 500° C.

3 Claims, 4 Drawing Sheets

(56) References Cited

FOREIGN PATENT DOCUMENTS

| JP | 2006083009 A | * | 3/2006 |
|---|---|---|---|
| JP | 2010-241647 A | | 10/2010 |
| JP | 2013-006734 A | | 1/2013 |
| WO | WO-03/089373 A | | 10/2003 |
| WO | WO-2011/005114 A1 | | 1/2011 |

OTHER PUBLICATIONS

J.M. Rivas-Mercury et al., "Dehydration of $Ca_3Al_2(SiO_4)y(OH)_{4(3-y)}$ ($0<y<0.176$) studied by neutron thermodiffractometry", Journal of the European Ceramic Society, available online Mar. 19, 2008, vol. 28, pp. 1737-1748.

Katsuro Hayashi, "Heavy doping of H ion in $12CaO \cdot 7Al_2O_3$", Journal of Solid State Chemistry, 2011, vol. 184, pp. 1428-1432.

International Search Report mailed Feb. 12, 2013, issued for PCT/JP2013/050442.

* cited by examiner

HYDROGEN GENERATION RATE

XRD PATTERN OF MAYENITE

CONTINUOUS PRODUCTION METHOD OF HYDROGEN

CROSS REFERENCE TO RELATED APPLICATIONS

This application is related to co-pending application: "METHOD FOR PREPARING HYDROGEN" filed even date herewith in the names of Susumu HIKAZUDANI, Atsushi WAKUI, Masaharu FURUTERA, Hitoshi OSHIRO, Tetsuya INOUE and Kazuyuki HIRAO as a national phase entry of PCT/JP2013/050440, which application is assigned to the assignee of the present application and is incorporated by reference herein.

TECHNICAL FIELD

The present invention relates to a continuous production method of hydrogen.

BACKGROUND ART

In recent years, a number of proposals of using, as an energy source, hydrogen that is clean energy have been made, and for example, development of automobiles to be driven by a fuel cell using hydrogen as a fuel is conducted. An exhaust gas from a fuel cell using hydrogen as a fuel does not contain nitrogen oxides, particulate matters, carbon dioxide, and the like which are contained in an exhaust gas from an internal combustion engine, and hence, such a fuel cell receives a lot of attention as a clean power source capable of suppressing environmental pollution and global warming.

However, a volume in storing hydrogen is large, and for example, in a fuel cell for automobile, a supply means of hydrogen that is the fuel is of a problem.

The following Patent Document 1 discloses a method for generating hydrogen by decomposing ammonia or the like and describes an apparatus for generating hydrogen for fuel cell having a decomposer of decomposing a hydrogen source composed of ammonia and/or hydrazine into nitrogen and hydrogen by a catalytic reaction and supplying them into a fuel cell; and furthermore, the following Patent Document 2 describes a hydrogen generating apparatus for efficiently generating hydrogen from ammonia, in which the invention of Patent Document 1 is improved, and a hydrogen generating method.

Meanwhile, miniaturization of a fuel cell per se is demanded, and this is aimed at utilization in place of an AC-DC convertor of a charging type secondary cell which is used for mobile phones, PDA (Personal Digital Assistant), digital cameras, notebook personal computers, and the like.

BACKGROUND ART DOCUMENT

Patent Document

Patent Document 1: JP-A-2003-40602
Patent Document 2: JP-A-2010-241647

SUMMARY OF THE INVENTION

Problems to be Solved by the Invention

However, in the conventional method of producing hydrogen by a catalytic reaction of ammonia described in the above-described Patent Documents 1 and 2, ammonia is one of the specified offensive odor substances stipulated in the Offensive Odor Control Law and is also designated as a deleterious substance in the Poisonous and Deleterious Substances Control Law, and therefore, there was involved such a problem that handling of ammonia is very troublesome.

An object of the invention is to solve the above-described problem as stated in BACKGROUND ART and to provide a continuous production method of hydrogen which is able to produce hydrogen, which is clean energy, simply and continuously without using ammonia as stated in BACKGROUND ART and which has a very high level of safety.

In addition, the object of the invention is to provide a continuous production method of hydrogen which is able to miniaturize a fuel cell per se using hydrogen that is clean energy and which is also applicable to a fuel cell which can be utilized in place of an AC-DC convertor of a charging type secondary cell which is, for example, used for mobile phones, PDA (Personal Digital Assistant), digital cameras, notebook personal computers, and the like.

Means for Solving the Problem

In order to attain the foregoing object, an invention of a continuous production method of hydrogen of claim 1 is characterized by including a hydrogen production step comprising introducing mayenite ($Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite to regenerate mayenite and calcium hydroxide; and a circulation step comprising returning the regenerated mayenite and calcium hydroxide into the hydrogen production step.

An invention of claim 2 is concerned with the continuous production method of hydrogen as set forth in claim 1, which is characterized in that a temperature of water in the hydrogen production step is from 50 to 100° C., and a molar ratio of mayenite to calcium hydroxide is 1/9.

An invention of claim 3 is concerned with the continuous production method of hydrogen as set forth in claim 1, which is characterized in that a baking temperature of katoite in the regeneration step is from 300 to 500° C.

Effects of the Invention

The invention of the continuous production method of hydrogen of claim 1 is characterized by including a hydrogen production step comprising introducing mayenite ($Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite to regenerate mayenite and calcium hydroxide; and a circulation step comprising returning the regenerated mayenite and calcium hydroxide into the hydrogen production step. According to the invention of claim 1, there give rise to such effects that hydrogen, which is clean energy, can be produced simply and continuously without using ammonia as stated in BACKGROUND ART; and that the safety level is very high.

In addition, according to the continuous production method of hydrogen of the invention, there give rise to such effects that a fuel cell per se using hydrogen, which is clean energy, can be miniaturized; and that the continuous production method of hydrogen of the invention is also applicable to a fuel cell which can be utilized in place of an AC-DC convertor of a charging type secondary cell which is, for example, used for mobile phones, PDA (Personal Digital Assistant), digital cameras, notebook personal computers, and the like.

The invention of claim 2 is concerned with the continuous production method of hydrogen as set forth in claim 1, which is characterized in that a temperature of water in the hydrogen production step is from 50 to 100° C., and a molar ratio of mayenite to calcium hydroxide is 1/9. According to the invention of claim 2, there gives rise to such an effect that hydrogen can be efficiently produced from mayenite and calcium hydroxide.

The invention of claim 3 is concerned with the continuous production method of hydrogen as set forth in claim 1, which is characterized in that a baking temperature of katoite in the regeneration step is from 300 to 500° C. According to the invention as set forth in claim 3, there give rise to such effects that the generation of mayenite does not require, for example, a high-temperature treatment of heating to from 1,200 to 1,350° C. in air; and that the cost of equipment and heating cost are inexpensive, and in its turn, the production cost of hydrogen is inexpensive.

MODES FOR CARRYING OUT THE INVENTION

Figure 1:
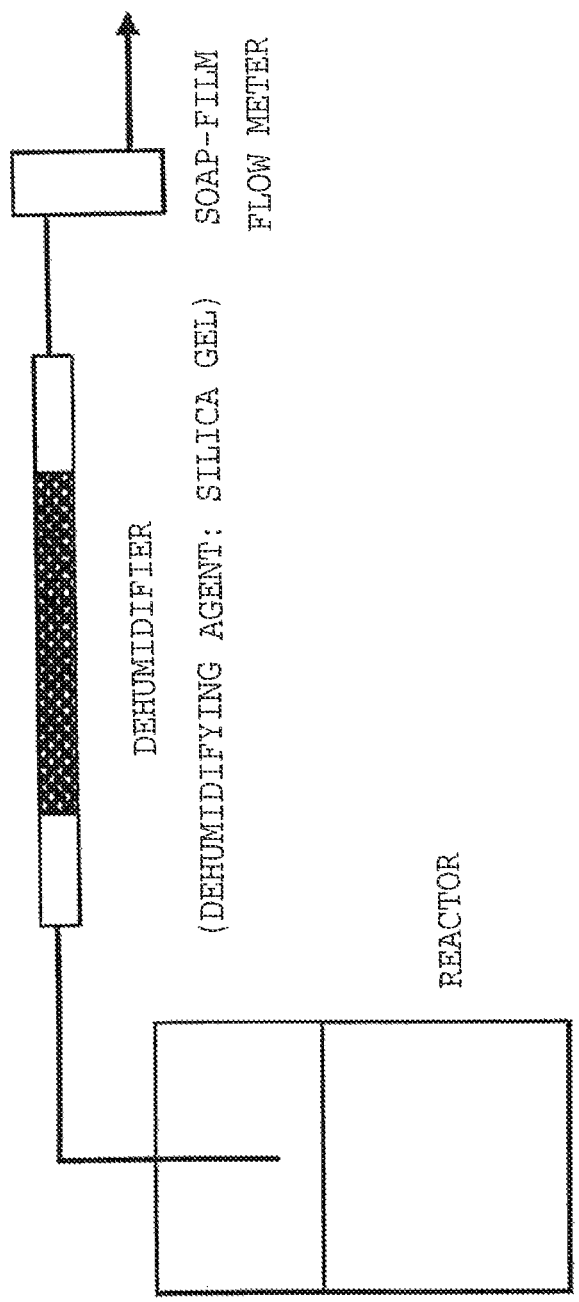
FIG. 1 is a diagrammatic flow sheet showing an example of a testing apparatus for hydrogen production in which the continuous production method of hydrogen of the invention was carried out.

Next, embodiments of the invention are described, but it should not be construed that the invention is limited thereto.

The continuous production method of hydrogen according to the invention is characterized by including a hydrogen production step comprising introducing mayenite $Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite to regenerate mayenite and calcium hydroxide; and a circulation step comprising returning the regenerated mayenite and calcium hydroxide into the hydrogen production step.

In the hydrogen production step of the continuous production method of hydrogen of the invention, when mayenite and calcium hydroxide are introduced into water and allowed to react with water, katoite [$Ca_3Al_2(OH)_{12}$] and hydrogen ($H_2$) are generated according to the following reaction formula.

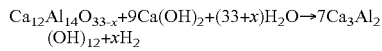
$Ca_{12}Al_{14}O_{33-x}+9Ca(OH)_2+(33+x)H_2O \rightarrow 7Ca_3Al_2(OH)_{12}+xH_2$ In this hydrogen production step, it is preferable that a temperature of water is from 50 to 100° C., and a molar ratio of mayenite to calcium hydroxide is 1/9.

Here, when the temperature of water in the hydrogen production step of the continuous production method of hydrogen is lower than 50° C., not only a rate of hydrogen generation reaction becomes slow, and the yield becomes poor, and hence, such is not preferable. It is to be noted that in the generation reaction of hydrogen, although the temperature of water does not exceed 100° C., the temperature of water is preferably not higher than 100° C.

Subsequently, in the regeneration step of the continuous production method of hydrogen of the invention, the formed katoite is baked to regenerate mayenite and calcium hydroxide.

Here, when katoite is baked, mayenite and calcium hydroxide are generated according to the following reaction formula.

$7Ca_3Al_2(OH)_{12} \rightarrow Ca_{12}Al_{14}O_{33}+9Ca(OH)_2+33H_2O$ In that case, it is preferable that a baking temperature of katoite is from 300 to 500° C.

Here, when the baking temperature of katoite is lower than 300° C., a dehydration reaction does not sufficiently proceed, and the yield is poor, and hence, such is not preferable. In addition, when the baking temperature of katoite exceeds 500° C., a crystal structure of katoite is broken, and the yield is poor, and hence, such is not preferable.

According to the production method of mayenite according to the invention, mayenite and calcium hydroxide can be regenerated without requiring a high-temperature treatment of heating to from 1,200 to 1,350° C. in air as stated in BACKGROUND ART, and the cost of equipment and heating cost are inexpensive, and in its turn, the production cost of hydrogen is inexpensive.

Furthermore, in the circulation step of the continuous production method of hydrogen of the invention, the regenerated mayenite and calcium hydroxide are returned into the hydrogen production step.

According to the continuous production method of hydrogen according to the invention, it is possible to produce hydrogen, which is clean energy, simply and continuously without using ammonia as stated in BACKGROUND ART. Then, since all of mayenite and calcium hydroxide are a non-poisonous powdered or granulated substance, they are easy in handling and they have a high level of safety.

In addition, according to the continuous production method of hydrogen of the invention, a fuel cell per se using hydrogen, which is clean energy, can be miniaturized, and the production method of hydrogen of the invention is also applicable to a fuel cell which can be utilized in place of an AC-DC convertor of a charging type secondary cell which is, for example, used for mobile phones, PDA (Personal Digital Assistant), digital cameras, notebook personal computers, and the like.

EXAMPLES

Next, the Example of the invention is described together with the Comparative Example, but it should not be construed that the invention is limited to these Examples.

Example 1

The continuous production method of hydrogen according to the invention was carried out by using a testing apparatus for hydrogen production shown in FIG. 1.

The continuous production method of hydrogen according to the invention comprises a hydrogen production step comprising introducing mayenite ($Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite regenerate mayenite and calcium hydroxide; and a circulation step comprising returning the regenerated mayenite and calcium hydroxide into the hydrogen production step.

<Hydrogen Production Step>

First of all, 200 mL of ion-exchanged water was charged in a reactor (separable flask) having a capacity of one liter. Subsequently, 9 g of an aluminum powder (a trade name: #150, manufactured by Minalco Ltd.) and 12 g of calcium hydroxide [$Ca(OH)_2$] (manufactured by Wako Pure Chemical industries, Ltd.) were introduced into the reactor, followed by stirring. After completion of generation of a hydrogen gas, the ion-exchanged water was filtered, and the separated solid was dried in air at a temperature of 70° C.

The obtained solid was katoite, and when this was baked in air at a temperature of 300° C. for 2 hours, mayenite ($Ca_{12}Al_{14}O_{33}$) and calcium hydroxide were formed.

Figure 2:
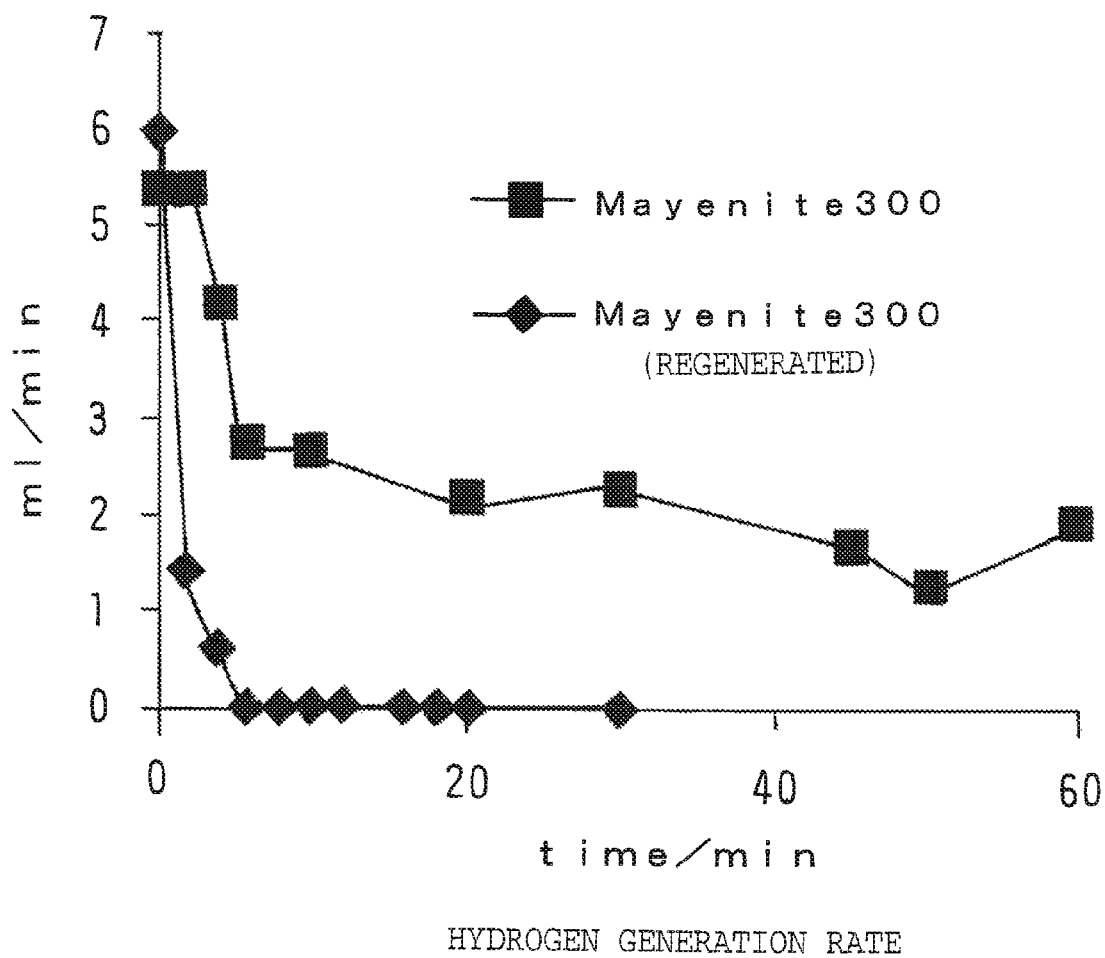
FIG. 2 is a graph showing a change with time of hydrogen generation rate in a hydrogen production test in which the continuous production method of hydrogen of the invention was carried out.

200 mL of ion-exchanged water was charged in a reactor (separable flask) having a capacity of one liter. Subsequently, 9 g of the above-obtained mixture of mayenite ($Ca_{12}Al_{14}O_{33}$) and calcium hydroxide [$Ca(OH)_2$] (molar ratio: 1/9) was introduced into the reactor, followed by stirring. The temperature of the ion-exchanged water was raised to 55° C. by heating. The mayenite and calcium hydroxide were allowed to react with water, thereby generating hydrogen. The hydrogen gas was allowed to pass through a dehumidifier filled with a silica gel as a dehumidifying agent to remove water, and a generation amount thereof was then measured by a soap-film flow meter. A component of the generated gas was analyzed by a TCD (Thermal Conductivity Detector) type gas chromatograph (a trade name: GC-8A, manufactured by Shimadzu Corporation) and confirmed to be hydrogen. It was confirmed that the hydrogen gas was generated over 60 minutes after the ion-exchanged water had reached the prescribed temperature. A change with time of hydrogen generation rate at that time is shown in the following FIG. 2. The amount of the hydrogen gas generated over about 60 minutes was about 300 mL.

Here, when mayenite and calcium hydroxide were introduced into water and allowed to react with water, katoite [$Ca_3Al_2(OH)_{12}$] and hydrogen ($H_2$) were generated according to the following reaction formula.

$$Ca_{12}Al_{14}O_{33-x}+9Ca(OH)_2+(33+x)H_2O \rightarrow 7Ca_3Al_2(OH)_{12}+xH_2$$

Figure 3:
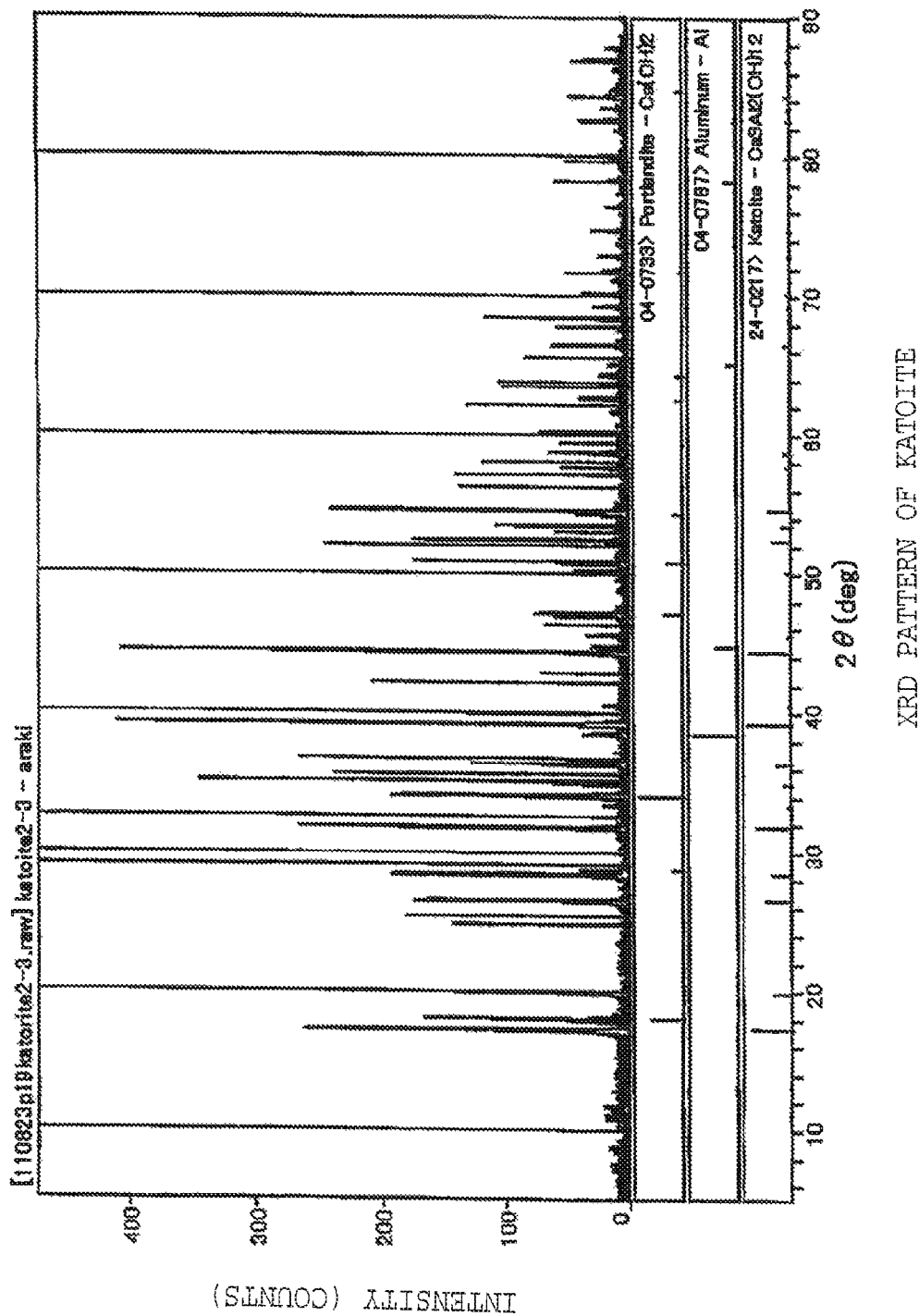
FIG. 3 is a chart showing a pattern of measurement results of XRD (X-ray diffraction spectroscopy) of katoite in the Example of the invention.

Here, from the pattern of measurement results of XRD (X-ray diffraction spectroscopy) shown in FIG. 3, the peaks assigned to a structure of katoite are shown, and it was confirmed that katoite was formed.

<Regeneration Step>

After completion of generation of a hydrogen gas, the ion-exchanged water was filtered, and the separated solid was dried in air at a temperature of 70° C.

The obtained solid was katoite as in the above, and this was baked in air at a temperature of 300° C. for 2 hours.

Subsequently, mayenite ($Ca_{12}Al_{14}O_{33}$) was generated by baking of this katoite according to the following reaction formula. A yield of mayenite was 80%.

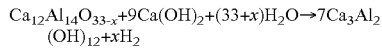

Figure 4:
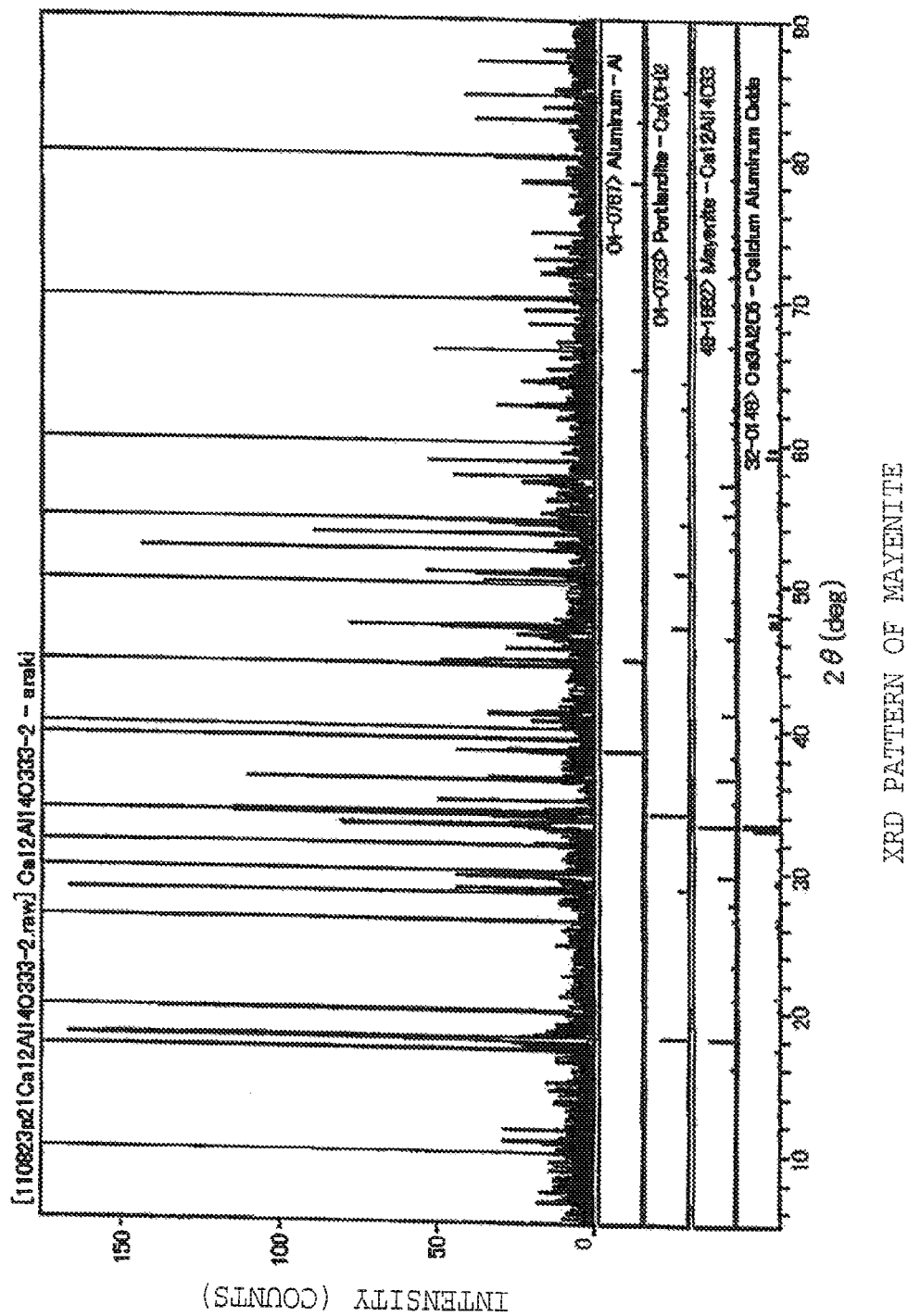
FIG. 4 is a chart showing a pattern of measurement results of XRD (X-ray diffraction spectroscopy) of mayenite in the Example of the invention.

Here, from the pattern of measurement results of XRD (X-ray diffraction spectroscopy) shown in FIG. 4, the peaks assigned to a structure of mayenite are shown, and it was confirmed that mayenite was formed.

<Circulation Step>

Subsequently, 6.1 g of mayenite and 2.9 g of calcium hydroxide as regenerated were returned into the hydrogen production step.

Furthermore, the hydrogen production step was again carried out by using the regenerated mayenite and calcium hydroxide. After the ion-exchanged water reached a prescribed temperature, it was confirmed that a hydrogen gas was generated over about 10 minutes. A change with time of hydrogen generation rate at that time is also shown in the following FIG. 2. The amount of the hydrogen gas generated over about 7 minutes was about 20 mL. It is to be noted that it is considered that the decrease of the yield of hydrogen in the hydrogen production step using the regenerated mayenite and the regenerated calcium hydroxide is caused due to the fact that a lattice structure of the interior of the regenerated mayenite did not recover. However, here, although the decrease of the yield of hydrogen is a problem to be improved, it has become clear that it is possible to again carry out the hydrogen production step by using the regenerated mayenite and calcium hydroxide.

From this fact, according to the continuous production method of hydrogen of the invention, hydrogen that is clean energy is produced simply and continuously without using ammonia as stated in BACKGROUND ART, and the safety level is very high.

In addition, according to the continuous production method of hydrogen of the invention, it is considered that a fuel cell per se using hydrogen, which is clean energy, can be miniaturized, and the continuous production method of hydrogen of the invention is also applicable to a fuel cell which can be utilized in place of an AC-DC convertor of a charging type secondary cell which is, for example, used for mobile phones, PDA (Personal Digital Assistant), digital cameras, notebook personal computers, and the like.

Comparative Example 1

For comparison, although the same experiment as that in the case of the above-described Example 1 was conducted, a different point from the case of Example 1 resides in a point that in the regeneration step of mayenite and calcium hydroxide, baking of katoite that is a previously obtained solid was carried out at a temperature of 100° C. As a result, the solid after baking showed the same pattern as that of measurement results of XRD (X-ray diffraction spectroscopy) shown in FIG. 3 and was confirmed to be katoite as it was, and mayenite was not formed. For that reason, the final circulation step could not be carried out.

The invention claimed is:

1. A continuous production method of hydrogen, which is characterized by including a hydrogen production step comprising introducing mayenite ($Ca_{12}Al_{14}O_{33}$) and calcium hydroxide [$Ca(OH)_2$] into water and allowing them to react with water, thereby generating hydrogen and also forming katoite [$Ca_3Al_2(OH)_{12}$]; a regeneration step comprising baking the formed katoite to regenerate mayenite and calcium hydroxide; and a circulation step comprising returning the regenerated mayenite and calcium hydroxide into the hydrogen production step.

2. The continuous production method of hydrogen according to claim 1, which is characterized in that a temperature of water in the hydrogen production step is from 50 to 100° C., and a molar ratio of mayenite to calcium hydroxide is 1/9.

3. The continuous production method of hydrogen according to claim 1, which is characterized in that a baking temperature of katoite in the regeneration step is from 300 to 500° C.

* * * * *